April 7, 1931.          F. S. CARR          1,800,176
NUT AND SCREW FASTENING
Filed July 22, 1925
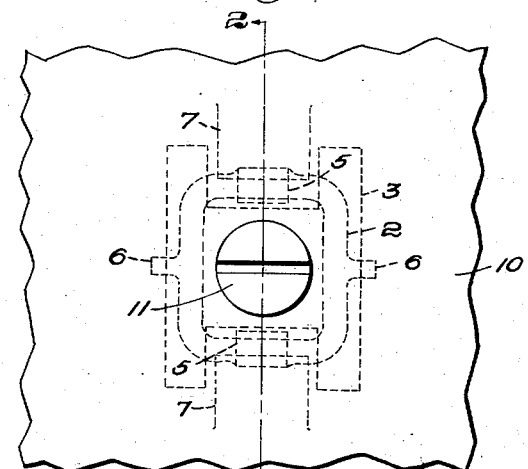
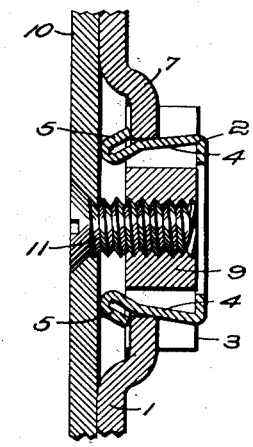
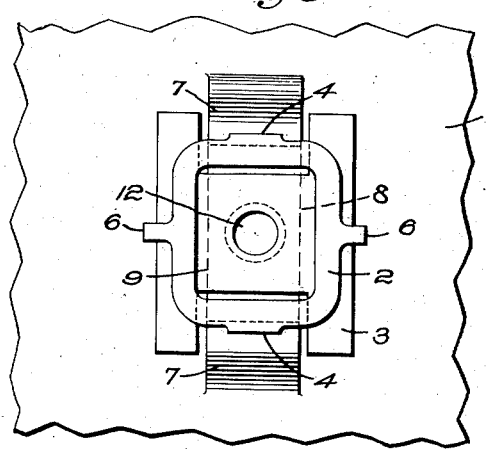
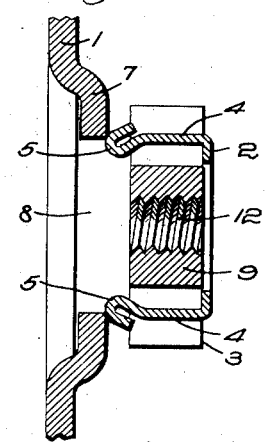
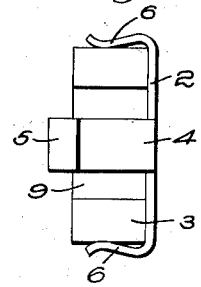
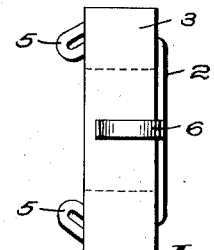
Inventor:
Fred S. Carr,
by Emery Booth Janney Varney
Attys.

Patented Apr. 7, 1931

1,800,176

UNITED STATES PATENT OFFICE

FRED S. CARR, OF NEWTON, MASSACHUSETTS, ASSIGNOR, BY MESNE ASSIGNMENTS, TO UNITED-CARR FASTENER CORPORATION, OF CAMBRIDGE, MASSACHUSETTS, A CORPORATION OF MASSACHUSETTS

NUT AND SCREW FASTENING

Application filed July 22, 1925. Serial No. 45,275.

This invention aims to provide an improved nut and screw fastening installation.

In the drawings, which illustrate a preferred embodiment of my invention:—

Figure 1 is an elevation view of the complete installation showing underlying parts in dotted lines;

Fig. 2 is a section on line 2—2 of Fig. 1, being partly in elevation;

Fig. 3 is an elevation of the nut unit and its support as viewed from the inner side thereof;

Fig. 4 is a vertical section showing the nut unit and its support prior to assembly thereof;

Fig. 5 is a top view of the nut unit; and

Fig. 6 is a side elevation of the nut unit.

Referring to the drawings, I have illustrated a nut and screw fastening device which is particularly, though not exclusively, useful for securing fixtures of various kinds to various metal supports. In the drawings I have shown the fastening device in connection with securing two sheet metal parts together, one of which provides a support 1 for the nut unit part of the fastener.

The nut unit, as illustrated, includes a nut-holder 2 pressed from a single piece of metal and an H-shaped nut 3 carried by the holder. The holder 2 is provided with a pair of opposed contractible and expansible fingers 4 having reversely bent portions 5 at their free ends as illustrated in Figs. 2 and 4. These fingers are located between the parallel side portions of the H-shaped nut and are substantially narrower than the spaces between the side portions. The holder 2 is also provided with relatively short oppositely disposed resilient portions 6, which engage the sides of the nut 3, but do not project beyond the outer face thereof. These resilient portions 6 hold the nut in assembled relation with the holder as illustrated in Figs. 3, 5 and 6.

The support 1 is initially prepared for reception of the nut unit by pressing two lips 7, 7 inwardly therefrom and providing a rectangular aperture 8 between the ends of the lips 7, 7.

Assembly of the nut unit with the support 1 is effected by pressing the reversely bent portions 5 of the fingers 4 against the edges of the lips 7, 7 from the inner side of the support (Fig. 4) and forcing the unit toward the support to contract the fingers 4 and force them through the aperture 8. After the reversely bent portions 5 pass through the aperture 8, the fingers expand so that the outer ends of the reversely bent portions 5 are hooked over and seated against the outer faces of the lips 7, 7 thereby to hold the nut unit in assembled relation with the support, as illustrated in Fig. 2.

As illustrated in Fig. 3, the lips 7, 7 fit into the spaces between the parallel portions of of the H-shaped nut 3 and are relatively narrower than the spaces therebetween, thereby to permit transverse shifting of the entire nut unit relative to the ends of the lips 7, 7. The cross piece 9 of the H-shaped nut is relatively narrower than the space between the fingers 4, thereby permitting transverse shifting of the nut toward the fingers, as best illustrated in Figs. 2 and 3. Thus it will be understood that the nut may shift transversely to a limited extent in any direction relative to the support for purposes more fully hereinafter described.

The sheet metal part 10 may be secured against the outer face of the support 1 by a screw 11 passing through a hole in the part 10 and threaded into the nut 3, as best illustrated in Fig. 2. If the screw-threaded hole 12 in the nut 3 does not align with the hole in the part 10, the nut may be shifted laterally relative to the support 1 until the holes in the nut and the part 10 are in alignment for reception of the screw 11. This transverse shiftability of the nut relative to the support and to the nut-holder 2 provides means for correcting inaccuracies which may occur when forming the aperture in the support 1 and the hole in the part 10.

The holder 2 merely provides means for holding the nut 3 in place upon the support, and prevents rotation of the nut relative to the support while the part 10 is being secured thereto. Thus when the parts are secured together, the nut is clamped tightly against the inner face of the support 1 and the part 10 is clamped tightly against the outer face of the support, as best illustrated in Fig. 2.

While I have shown and described a preferred embodiment of my invention, it will be understood that changes involving omission, substitution, alteration and reversal of parts, and even changes in the mode of operation, may be made without departing from the scope of my invention, which is best defined in the following claims.

Claims:

1. A fastening installation comprising, in combination, a support, a part to be secured thereto, a screw for securing said part to said support and a nut unit including a nut-holder resiliently secured to said support and shiftable longitudinally, transversely relative to the support and a nut carried by said holder and shiftable transversely relative to said holder at right angles to the transverse shiftability of said nut-holder whereby the combined shifting of both provide for transverse movement of the nut in any direction to permit alignment with said screw.

2. A fastening installation comprising, in combination, a support, a part to be secured thereto, a screw for securing said part to said support and a nut unit including a nut-holder and a nut carried by said holder, said holder presenting a plurality of resilient fingers for securing said unit to the support, said fingers being of less width than the aperture in the support through which said fingers are pressed thereby to permit shifting of said unit relative to the support, means permitting said nut to shift transversely toward the resilient fingers and means other than the fingers cooperating between the nut and nut-holder for securing said nut in assembled relation with the holder.

3. A nut unit of the class described comprising, in combination, a nut-holder having a base portion, a nut supported upon said base portion, a pair of opposed resilient fingers of substantial length extending from the base portion and having means for engagement with a supporting structure to secure the nut unit thereto, said nut being relatively narrow between the said fingers so as to be spaced from said fingers to permit lateral shifting toward and away from each of said fingers and a pair of opposed relatively short yieldable portions extending from the base portion and normally yieldingly engaging opposite sides of the nut to prevent movement of the nut in a direction transverse to the line of movement toward and away from said fingers.

4. A fastening installation comprising, in combination, a support having an aperture therethrough, a plurality of lips struck inwardly from said support at the edges of said aperture and a nut unit including a holder presenting resilient means for engagement with said lips to secure said unit to said support and an H-shaped nut presenting portions at the sides of said lips seated against the inner face of said support.

In testimony whereof I have signed my name to this specification.

FRED S. CARR.